United States Patent [19]

Appel et al.

[11] 4,308,752
[45] Jan. 5, 1982

[54] MAGNETIC FLOWMETER

[75] Inventors: Eggert Appel, Dransfeld; Peter Nissen, Rosdorf, both of Fed. Rep. of Germany

[73] Assignee: Fischer & Porter Co., Warminster, Pa.

[21] Appl. No.: 123,016

[22] Filed: Feb. 20, 1980

[30] Foreign Application Priority Data

Apr. 18, 1978 [DE] Fed. Rep. of Germany ....... 2816796

[51] Int. Cl.³ .............................................. G01F 1/58
[52] U.S. Cl. .............................. 73/861.12; 73/861.15
[58] Field of Search ........... 73/861.12, 861.14, 861.15, 73/861.16, 861.17

[56] References Cited

U.S. PATENT DOCUMENTS 3,589,186 6/1971 Bourg et al. ..................... 73/861.16

FOREIGN PATENT DOCUMENTS 1914335 12/1970 Fed. Rep. of Germany ... 73/861.15

*Primary Examiner*—Charles A. Ruehl
*Attorney, Agent, or Firm*—Michael Ebert

[57] ABSTRACT

A magnetic flowmeter which generates a signal proportional to the flow rate of a fluid passing through a pipe to intersect a magnetic field whose lines of flux are substantially parallel to a transverse axis normal to the longitudinal axis of the pipe. The flowmeter includes two electrode assemblies mounted on the pipe on opposite sides of the transverse axis and capacitively coupled to the fluid. The effective coupling capacity of the electrodes in each assembly is such as to render the signal substantially immune to the influence of non-axisymmetric flow profiles.

4 Claims, 7 Drawing Figures

MAGNETIC FLOWMETER

BACKGROUND OF INVENTION

This invention relates generally to magnetic flowmeters, and more particularly to a flowmeter in which the fluid to be metered is conducted through a pipe to intersect a magnetic field, the flowmeter including electrodes in the region of the magnetic field which are capacitively coupled to the fluid to yield a signal that is a function of flow rate.

German patent publication No. 1963901 discloses a magnetic flowmeter whose electrodes are in contact with the fluid being metered and are therefore galvanically coupled thereto. With this electrode arrangement, it is possible to derive signals that are essentially proportional to the flow rate even if the flow profile is non-axisymmetric. To this end, the magnetic field is accommodated to the weighting factors. One must, however, recognize that it is theoretically impossible to fully attain this result, as a consequence of which flow errors arise depending on the flow profile.

Moreover, since in this German patent publication, the electrodes which are galvanically coupled to the fluid are rectangular in form, they are subject to contamination by the fluid. This contamination can result in erroneous readings; for the signal from the contaminated electrodes is no longer proportional to flow rate.

The disadvantages which arise in an arrangement in which the flowmeter electrodes are in contact with the fluid are eliminated in the electrode arrangement disclosed in German patent DE-PSI No. 548,918 in which the electrodes are capacitively coupled to the fluid. However, this patent is silent on the magnetic field distribution and the electrode geometry necessary to minimize or eliminate the adverse influence of flow profile on the electrode signal.

Also known are magnetic flowmeters which include multiple-point electrodes in which weighted signals from the electrodes are added in a converter. This multiple-point electrode arrangement makes necessary a more complicated construction, particularly with regard to sealing problems. It also entails more complex electronic circuits.

SUMMARY OF INVENTION

In view of the foregoing, the main object of this invention is to provide a magnetic flowmeter whose electrodes cannot become contaminated, the electrode arrangement being such that it does not unduly complicate the construction of the meter nor add to the complexity of the associated electronic circuits.

Briefly stated, this object is attained in a flowmeter in which the fluid to be metered is conducted through a pipe having a longitudinal axis Z which intersects a diametrical axis X normal thereto, the meter being provided with a magnet assembly producing a magnetic field whose lines of flux are substantially parallel to a transverse axis Y normal to both the X and Z axes.

Mounted on the pipe on opposite sides of the Y axis in the region of the magnetic field are two electrode assemblies that are capacitively coupled to the fluid, the assemblies being connected to a converter to produce a signal proportional to the flow rate of the fluid.

The two electrode assemblies act to detect the potential $\phi$ present on the fluid surface, the effective coupling capacity of the electrodes in each assembly decreasing with increasing angle from the X axis in a rectangular coordinate system defined by said axes.

OUTLINE OF DRAWINGS

For a better understanding of the invention as well as other objects and further features thereof, reference is made to the following detailed description to be read in conjunction with the accompanying drawings, wherein.

Figure 6:
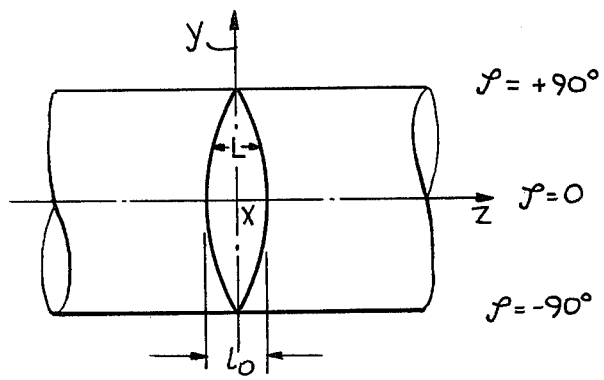
Figure 7:
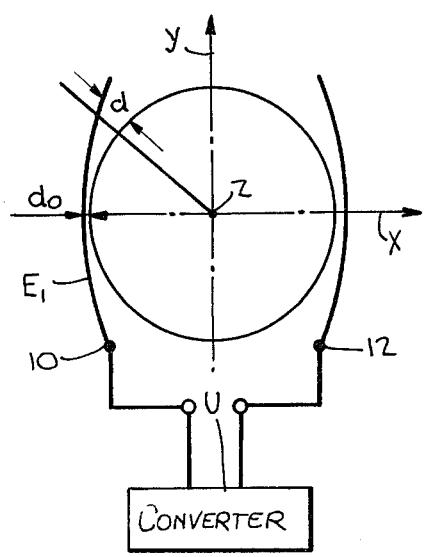

FIG. 6 schematically illustrates in side view, a second embodiment of the invention; and FIG. 7 schematically shows a third embodiment.

DESCRIPTION OF INVENTION

Introduction

The purpose of the present invention is to provide a magnetic flowmeter whose signal is immune to the influence of a non-axisymmetric flow profile and is proportional to flow rate. The solution to the problem presented by this flow profile is based on the well substantiated theory which states that an error-free flow rate measurement is attainable even for non-axisymmetric profiles if the magnitude ($B_y$) of the magnetic field is uniform and if the electric potential ($\phi$) which exists on the fluid surface is multiplied by $\cos \psi$ and line-integrated around the curve C which encloses the flow area which is perpendicular to the flow direction in accordance with the following equation.

$$\vec{B} \cdot V_Z = K \oint \phi(R, \varphi) \cos \varphi \, d\varphi \tag{1}$$

In this equation:

$$\vec{B} = (O, B_Y, O)$$

this being the magnetic field vector which has a signal component that is a function of its location in the coordinate system.

Figure 1:
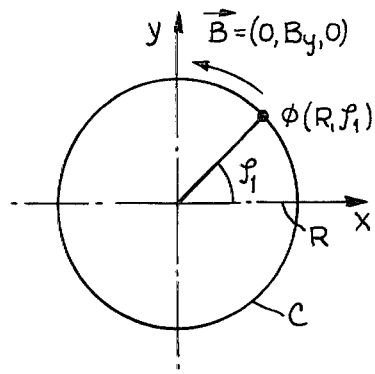
FIG. 1 is a cross-sectional view of a conventional magnetic flowmeter pipe to illustrate the relationship of the magnetic field to the potential induced in the fluid passing through the pipe.
Figure 2:
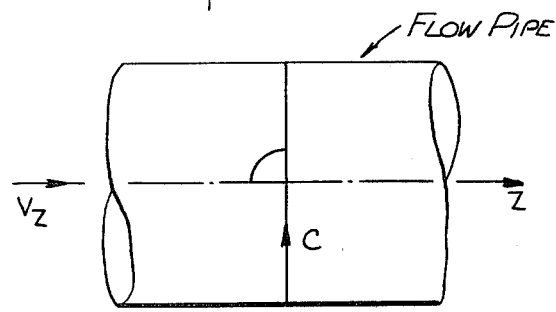
FIG. 2 is a side view of the flowmeter pipe.

The coordinate system is illustrated in FIGS. 1 and 2 where the longitudinal axis of the flow pipe is axis Z, the flow area therein being enclosed by circle C. Axis Z intersects a diametric axis X normal thereto. The lines of magnetic flux which are established within the flow pipe are substantially parallel to a transverse axis Y which intersects and is normal to both the Z and Y axes.

In the equation (1), $V_Z$: represents the velocity of the fluid in the direction of the Z axis;

K: is a proportionality factor independent of the other factors in the equation;

$\phi$: is the electrical potential on the fluid surface;

$\varphi$: is the angle between the point of integration and the X axis which together with the mutually perpendicular Y and Z axes form a rectangular coordinate system;

R: is the radius of the pipe;

C: is the integration path.

As long as $V_Z$ is not a function of Z, at least in the region of influence of the flowmeter, the surface potential $\phi$ will also be constant in the Z axis direction. One can therefore assume that a capacitively-coupled electrode arrangement will have no influence on potential $\Phi$ as long as the fluid conductivity is much larger than the coupling capacitance between the fluid and the electrodes.

With such a capacitively-coupled electrode arrangement which is immune to fluid contamination, it becomes possible to generate by a simple construction and relatively uncomplicated electronic circuitry a signal that is essentially proportional to flow rate.

The degree to which the coupling capacitance of the electrode must decrease with increasing angle is a function of the magnetic field distribution. This can be established empirically in each individual case. If the magnetic field is uniform, then, as will be obvious from equation (1), the flowmeter is preferably characterized by a coupling capacity which decreases in a manner approximately proportional to the $\cos \varphi$.

First Embodiment

Figure 3:
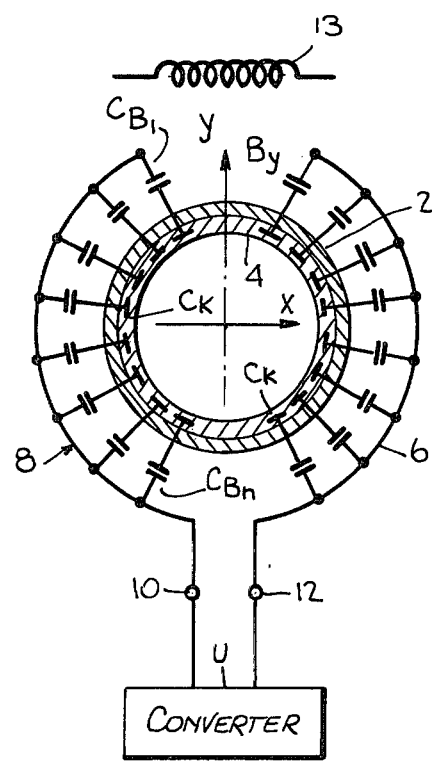
FIG. 3 is a cross-sectional view of a flowmeter pipe provided with electrode assembly in accordance with a first embodiment of the invention.

Referring now to FIG. 3, there is shown a first embodiment of a magnetic flowmeter in accordance with the invention which includes a flow pipe 2, the inner surface of which is covered by an insulation liner 4. Fluid to be metered is conducted through the pipe to intersect a magnetic field established by an electromagnetic assembly including coil 13.

Two electrode assemblies 6 and 8 are embedded in insulating liner 4 of the pipe on opposite sides of the Y axis. Each electrode assembly is composed of a series of electrodes $C_k$ having like faces of equal surface area, the electrodes in the series being spaced from each other by equal angular distances and being equi-spaced from the surface of the fluid passing through the pipe.

The insulated leads from electrodes $C_k$ in each assembly series extend through the pipe and serve to connect the electrodes to compensation capacitors $C_{Bl}$ to $C_{Bn}$. These capacitors are connected in parallel relation. The parallel-connected capacitors in electrode assembly 6 are connected to terminal 12 and those in assembly 10 to terminal 10. These terminals are the input terminal of a converter U.

Figure 4:
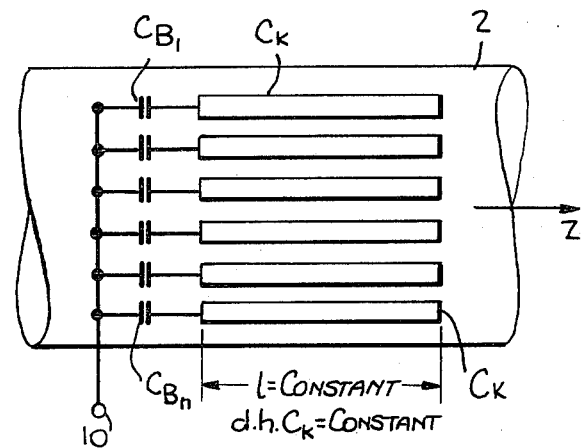
FIG. 4 shows a side view of the first embodiment.

As best seen in FIG. 4, the series of electrodes $C_k$ in each assembly thereof has a rectangular or strip form, all electrodes having the same length and width and all extending in the longitudinal direction on the pipe.

Figure 5:
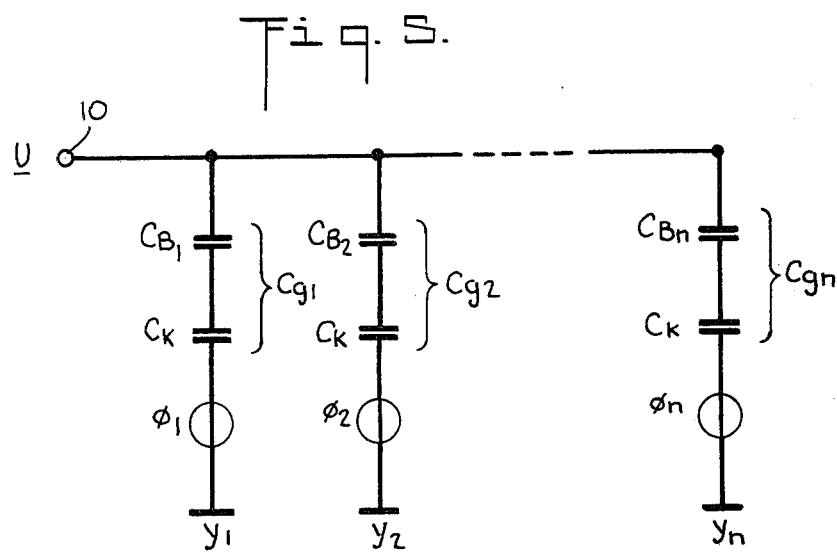
FIG. 5 illustrates the equivalent circuit of the first embodiment.

As shown in the equivalent circuit in FIG. 5, the surface potentials in the fluid at the angular locations $\varphi l$ to $\varphi_n$ is $\varphi$ to $\phi_n$. The series capacitances of the electrodes $C_k$ and their related compensation capacitors $C_{Bl}$ to $C_{Bn}$ are represented by symbols $C_{gi}$ to $C_{gn}$. Each value of this series capacitance is chosen to satisfy the following equation:

$$C_{gi} = \cos \varphi_i \sum_{k=1}^{n} C_{gh} \quad i = 1, \ldots, n \qquad (2)$$

Since the values of $C_k$ are known, the values of $C_{Bl}$ to $C_{Bn}$ can readily be calculated from this equation.

It is to be especially noted that the signal generated by the flowmeter is the result of the differential signal between only two electrode assemblies when the compensation capacitors are connected to the electrodes thereof.

Second Embodiment

In the second embodiment of the invention shown in FIG. 6, instead of two electrode assemblies, only two surface electrodes are provided on opposite sides of the Y axis. The length (l) of each electrode in the longitudinal direction of the pipe decreases from a maximum value $l_0$ along axis Z as a function of the angle from the X axis in accordance with the following equation:

$$l(\varphi) = l_0 \cdot \cos \varphi \qquad (3)$$

In practice, the pair of electrodes of the type shown in FIG. 6 must, of course, not touch. To this end, a space therebetween is provided at $\varphi \pm 90°$. In FIG. 6, the insulating liner has a uniform dielectric constant and the distance between the electrodes from all points thereon and the Z axis is constant.

Third Embodiment

In the third embodiment shown in FIG. 7, the electrodes $E_1$ and $E_2$ are mounted on the flow pipe on opposite sides of the Y axis, the electrodes having a rectangular shape. But the radial distance (d) between the Z axis and the electrodes is such that there is an increase from a value $d_o$ with increasing angular displacement from the X axis in accordance With the following equation:

$$d(\varphi) = d_0/\cos \varphi \qquad (4)$$

In practice, the value of d can vary between 1 mm and 1 cm, as determined by individual circumstances. Still another embodiment of the invention but not illustrated in the drawing is a flowmeter arrangement having rectangular electrodes on either side of the Y axis which are curved to conform to the circumference of the flow pipe, the curved electrodes being embedded in an insulating liner whose dielectric constant is a function of angle $\varphi$ in accordance with the following equation:

$$\epsilon(\varphi) = \epsilon_0 \cdot \cos \varphi \qquad (5)$$

It is to be noted that in the above-described embodiments, the relationships with $\cos \varphi$ are exactly true only if the magnetic field established within the flow pipe is uniform; that is, a field having homogeneous lines of flux. One can, however, use non-uniform magnetic fields without giving rise to large errors, or make modifications based on the results of test procedures to adapt the system to a non-uniform field in a manner minimizing errors.

While there have been shown and described preferred embodiments of a magnetic flowmeter in accordance with the invention, it will be appreciated that many changes and modifications may be made therein without, however, departing from the essential spirit thereof.

We claim:

1. A magnetic flowmeter for measuring the flow rate of a fluid conducted through a pipe having a longitudinal axis Z, the fluid intercepting a magnetic field whose lines of flux are essentially parallel to a transverse axis Y which is normal both to axis Z and a diametric axis X, said flowmeter further comprising:

A. a pair of electrode assemblies mounted on the pipe on opposite sides of the Y axis in the region of the magnetic field; and B. a converter whose input terminals are connected to the electrode assemblies to produce a signal which is substantially proportional to flow rate and is substantially immune to the influence of a non-axisymmetric flow profile, said electrode assemblies being out of contact with the fluid and being capacitively coupled thereto to detect a potential $\phi$ present on the fluid surface, the effective coupling capacitance of the assemblies decreasing in a manner substantially proportional to the cosine of angle $\varphi$ from the X axis.

2. A flowmeter as set forth in claim 1, wherein each electrode assembly is constituted by an equi-spaced series of like electrodes, each connected in series with a compensation capacitor whose capacitance is a function of the angle $\varphi$, the electrodes in the series being connected in parallel, whereby the parallel-connected electrodes in one assembly are connected to one input terminal of said converter, and those in the other assembly are connected to the other input terminal thereof.

3. A flowmeter as set forth in claim 1, wherein said electrode assemblies are constituted by a pair or surface electrodes, each electrode having a length in the longitudinal direction of the pipe which is greatest at the X axis and decreases with increasing angle $\varphi$ from the X axis.

4. A flowmeter as set forth in claim 1, wherein said electrode assemblies are constituted by a pair of surface electrodes, each of which has a radial distance with reference to the Z axis which is smallest at the X axis and increases with increasing angle $\varphi$ with respect to the X axis.

* * * * *

Notice of Adverse Decision in Interference

In Interference No. 100,942, involving Patent No. 4,308,752, E. Appel and P. Nissen, MAGNETIC FLOWMETER, final judgment adverse to the patentees was rendered Mar. 22, 1983, as to claims 1 and 4.
[*Official Gazette June 14, 1983.*]